(12) United States Patent
Mansell et al.

(10) Patent No.: US 7,249,270 B2
(45) Date of Patent: Jul. 24, 2007

(54) METHOD AND APPARATUS FOR PLACING AT LEAST ONE PROCESSOR INTO A POWER SAVING MODE WHEN ANOTHER PROCESSOR HAS ACCESS TO A SHARED RESOURCE AND EXITING THE POWER SAVING MODE UPON NOTIFICATION THAT THE SHARED RESOURCE IS NO LONGER REQUIRED BY THE OTHER PROCESSOR

(75) Inventors: David Hennah Mansell, Usk (GB); Richard Roy Grisenthwaite, Nr Royston (GB); Harry Samuel Thomas Fearnhamm, Cambridge (GB); Jeremy Piers Davies, Cambridge (GB)

(73) Assignee: ARM Limited, Cambridge (GB)

( * ) Notice: Subject to any disclaimer, the term of this patent is extended or adjusted under 35 U.S.C. 154(b) by 381 days.

(21) Appl. No.: 11/044,261

(22) Filed: Jan. 28, 2005

(65) Prior Publication Data
US 2005/0268106 A1   Dec. 1, 2005

(30) Foreign Application Priority Data
May 26, 2004   (GB)   ................................. 0411792.5

(51) Int. Cl.
*G06F 1/32*   (2006.01)
*G06F 12/00*   (2006.01)
(52) U.S. Cl. .................. 713/320; 711/100; 711/150
(58) Field of Classification Search ................ 713/300, 713/320, 324; 711/100, 150
See application file for complete search history.

(56) References Cited

U.S. PATENT DOCUMENTS 5,502,840 A * 3/1996 Barton ........................ 710/200
5,875,320 A * 2/1999 Gu ............................. 713/375

(Continued)

FOREIGN PATENT DOCUMENTS

WO   WO 2004/006097   1/2004

OTHER PUBLICATIONS

W.W. Collier et al, IBM Technical Disclosure Bulletin, vol. 18, No. 6, Nov. 1975, pp. 1953-1954.

*Primary Examiner*—Chun Cao
*Assistant Examiner*—Mark Connolly
(74) *Attorney, Agent, or Firm*—Nixon & Vanderhye P.C.

(57) ABSTRACT

The present invention provides a data processing apparatus and method of controlling access to a shared resource. The data processing apparatus has a plurality of processors operable to perform respective data processing operations requiring access to the shared resource, and a path is provided interconnecting the plurality of processors. An access control mechanism is operable to control access to the shared resource by the plurality of processors, each processor being operable to enter a power saving mode if access to the shared resource is required but the access control mechanism is preventing access to the shared resource by that processor. Further, each processor is operable, when that processor has access to the shared resource, to issue a notification on the path when access to the shared resource is no longer required by that processor. A processor in the power saving mode is arranged, upon receipt of that notification, to exit the power saving mode and to seek access to the shared resource. This approach has been found to result in significant power savings.

34 Claims, 6 Drawing Sheets

U.S. PATENT DOCUMENTS

| | | | |
|---|---|---|---|
| 6,910,212 B2 * | 6/2005 | Brenner et al. | 718/104 |
| 7,100,021 B1 * | 8/2006 | Marshall et al. | 712/19 |
| 7,162,666 B2 * | 1/2007 | Bono | 714/51 |
| 2002/0004810 A1 | 1/2002 | Reneris | |
| 2005/0166206 A1 * | 7/2005 | Parson | 718/104 |
| 2005/0289365 A1 * | 12/2005 | Bhandarkar | 713/300 |

* cited by examiner

Lock Routine

```
        MOV    r0, #1
try
        SWP    r0, r0, [Lock Addr]
        CMP    r0, #0
        WFE NE
        BNE    try
```

Unlock Routine

```
        MOV    r0, #0
        (Drain Write Buffer)
        STR    r0, [Lock Addr]
        (Drain Write Buffer)
        SEV
```

FIG. 2B

Lock Routine

```
            MOV         r1, #1
try
            LDREX       r0, [Lock Addr]
            CMP         r0, #0
            STREX EQ    r0, r1, [Lock Addr]
            WFE NE
            CMP EQ      r0, #0
            BNE         try
```

Unlock Routine

```
MOV   r0, #0
(Drain Write Buffer)
STR   r0, [Lock Addr]
(Drain Write Buffer)
SEV
```

FIG. 4B

METHOD AND APPARATUS FOR PLACING AT LEAST ONE PROCESSOR INTO A POWER SAVING MODE WHEN ANOTHER PROCESSOR HAS ACCESS TO A SHARED RESOURCE AND EXITING THE POWER SAVING MODE UPON NOTIFICATION THAT THE SHARED RESOURCE IS NO LONGER REQUIRED BY THE OTHER PROCESSOR

BACKGROUND OF THE INVENTION

1. Field of the Invention

The present invention relates to a data processing apparatus and method for controlling access to a shared resource in a data processing apparatus, and in particular controlling such access in a data processing apparatus having a plurality of processors operable to perform respective data processing operations requiring access to the shared resource.

2. Description of the Prior Art

It is known to provide multi-processing systems in which two or more processor cores share access to one or more shared resources, for example one or more data structures provided within a shared memory region. Such systems are typically used to gain higher performance by arranging the different processor cores to execute respective data processing operations in parallel. Known data processing systems which provide such multi-processing capabilities include IBM370 systems and SPARC multi-processing systems. These particular multi-processing systems are high performance systems where power efficiency and power consumption is of little concern and the main objective is maximum processing speed.

An important consideration in multi-processing systems where the multiple processors have access to a shared resource is the provision of a mechanism to control access to that shared resource to ensure that the data of that resource does not become inconsistent or corrupted due to multiple processors accessing the resource simultaneously. To deal with this issue, a typical multi-processor operating system may provide an access control mechanism such as a locking mechanism to protect the shared resource from being accessed by multiple processors simultaneously to prevent the data of the shared resource becoming inconsistent or corrupted if conflicting changes are made. If a lock is busy, i.e. has been set by one of the processors, it is often not practical for another processor that requires access to the shared resource associated with that lock to do anything except wait for the lock to be released, also referred to herein as the lock being cleared. For example, if a processor is handling an interrupt from a device it may need to add data received from the device to a shared queue. If another processor is removing data from the queue, the first processor must wait until the queue is in a consistent state and the lock has been released before it can then set the lock and add the new data to the queue. It cannot return from the interrupt handler until the data has been added to the queue, and hence it must wait.

In circumstances such as these, it is known to provide a "spin-lock" mechanism. In accordance with this mechanism, a processor requiring access to the protected data will attempt to obtain the lock, this involving reading the lock and then setting the lock if the read operation indicates that the lock is currently cleared. If the lock cannot be obtained, the processor repeatedly reads the lock value in a tight loop until the lock becomes available. At this point, the processor can then attempt once again to obtain the lock.

In a multi-processing system where low power consumption is desirable, this tight read loop is undesirable because energy is being consumed to no useful effect, and additionally in systems implementing multi-threading, the execution of spin-locks by waiting threads may be highly detrimental to performance.

Accordingly, it would be desirable to provide an improved technique for controlling access to a shared resource.

SUMMARY OF THE INVENTION

Viewed from a first aspect, the present invention provides a data processing apparatus comprising: a plurality of processors operable to perform respective data processing operations requiring access to a shared resource; an access control mechanism operable to control access to the shared resource by the plurality of processors; a path interconnecting the plurality of processors; each processor being operable to enter a power saving mode if access to said shared resource is required but the access control mechanism is preventing access to the shared resource by that processor; each processor further being operable, when that processor has access to the shared resource, to issue a notification on said path when access to the shared resource is no longer required by that processor; a processor in said power saving mode being operable, upon receipt of said notification, to exit said power saving mode and to seek access to the shared resource.

In accordance with the present invention, if a processor seeks to access a shared resource but is prevented from doing so by the access control mechanism, it is arranged to enter a power saving mode. Whilst in this power saving mode, that processor does not continue to seek access to the shared resource, and accordingly consumes significantly less power than would otherwise be the case. Furthermore, a processor that does have access to the shared resource is arranged to issue a notification when it no longer requires access to the shared resource, this notification being issued on a path interconnecting the plurality of processors within the data processing apparatus. Upon receipt of the notification by a processor that has entered the power saving mode, that processor is then operable to exit the power saving mode and to seek access to the shared resource. Hence, this notification is used as a mechanism to cause a processor in the power saving mode to "wake up" from that mode, and re-seek access to the shared resource. It has been found that this approach enables significant power savings to be achieved within the data processing apparatus.

It will be appreciated that the path may take a variety of forms. However, in one embodiment, the path comprises a dedicated path for the transfer of said notification between said plurality of processors, each of said processors having a port connected to said path. This ensures that there is no delay in the propagation of the notification.

It will be appreciated that in one embodiment a processor entering the power saving mode may be arranged to register an interest in a particular shared resource, if more than one such shared resource exists, with that information then being used by the processor that currently has access to that shared resource to ensure that the notification that it subsequently sends when it no longer requires access to that shared resource is directed to the appropriate processor(s). However, in one embodiment this approach is not used, and instead each processor is operable, when access to the shared resource is no longer required, to broadcast the notification to the remaining processors of said plurality. This enables a simplified implementation, in which no attempt is made to indicate which shared resource has become available when the notification is broadcast. If the notification relates to a different shared resource to that required by a processor in the power saving mode (or if another processor obtains the resource more quickly following that notification), then that processor on exiting the power saving mode and then failing to acquire access to the shared resource will merely re-enter the power saving mode and await receipt of the next notification.

In one embodiment, each processor has control storage which is set when said notification is received by that processor from the path. This enables a notification to be buffered at the processor, such that the processor can then determine from the value in the control storage whether a notification has been received by it. This is particularly useful in the situation where another processor determines that it no longer requires access to the shared resource (and hence issues the notification) between the time the processor seeking access to that resource determines that access is prevented and the time that processor enters the power saving mode. The use of the control storage avoids the possibility of the notification in such a situation being overlooked.

It will be appreciated that there are a number of ways in which a processor seeking access to a shared resource, but being prevented from such access, may enter the power saving mode. However, in one embodiment each processor is operable, if access to said shared resource is required but the access control mechanism is preventing access to the shared resource by that processor, to execute a wait for notification instruction to cause said power saving mode to be entered. Hence, in accordance with this embodiment, a processor that is seeking access to a shared resource but is prevented from access to that shared resource by the access control mechanism is arranged to execute a specific instruction which causes the power saving mode to be entered, until such time as a notification is received.

In one particular embodiment where the control storage is provided within each processor, the processor is operable upon execution of the wait for notification instruction to check whether the control storage has been set, and if so to prevent the power saving mode being entered. Instead, if it is determined that the control storage has been set, the processor can be arranged to merely clear the control storage and immediately seek access to the shared resource. This hence avoids the processor unnecessarily entering the power saving mode.

It will be appreciated that there are a number of ways in which a processor that has access to the shared resource can be arranged to issue the notification when it no longer requires access to that resource. However, in one embodiment, each processor is operable, when access to the shared resource is no longer required by that processor, to execute a send notification instruction to cause said notification to be issued on said path. Hence, in this embodiment each processor is arranged, when it no longer requires access to a shared resource that it currently does have access to, to execute a particular instruction in order to cause the notification to be issued.

It will be appreciated that the access control mechanism can take a variety of forms. However, in one embodiment, the access control mechanism comprises a lock associated with the shared resource, when that shared resource is accessed by one of said processors the lock being set, and when access to the shared resource is no longer required by that processor the lock being cleared prior to that processor issuing said notification on said path.

Such a lock will typically be maintained within a shared memory region, so that the value of the lock can be read by the various processors as and when required, and can be set by a processor when it gains access to the shared resource.

In one embodiment, when one of said processors wishes to access said shared resource, that processor is operable to perform an atomic operation to check whether the associated lock is cleared and if so to set the associated lock. The atomic operation ensures that the value of the lock cannot be changed by another processor between the time the lock is read to determine whether it is clear, and the time it is set by the processor. This is important to ensure that a processor does not read a lock that is cleared, but which is then set by a different processor prior to the lock being set by the processor that has read the "clear" value of the lock.

The atomic operation can be implemented in a variety of ways. However, in one embodiment, the processor is operable to perform said atomic operation by executing a swap instruction to cause the processor to read the value of the lock, to write a set value to the lock and to determine from the read value whether the associated lock was cleared. The nature of the swap instruction itself ensures that an atomic operation takes place, since the swap instruction reads the value of the lock and writes a set value to the lock as part of a single operation. If it transpires that the value of the lock that has been read is cleared, then the fact that the lock has been set by this processor ensures that no other processor subsequently reading the lock will see a value other than the set value. Similarly, if the processor executing the swap instruction determines from the read value that the associated lock was already set, then the fact that it has written a set value to the lock will be of no consequence. In this instance, the processor will merely determine that it cannot access the shared resource, and accordingly will enter the power saving mode to await notification from the processor that does have access to that shared resource when that processor has subsequently cleared the lock.

In an alternative embodiment, the data processing apparatus further comprises: monitor logic operable to monitor accesses to the lock by the plurality of processors; wherein the processor is operable to perform said atomic operation by: executing a load instruction to read the value of the lock and to initiate monitoring of the lock by the monitor logic; and executing a store instruction to store a set value to the lock if the monitor logic indicates that none of the other processors have modified the value of the lock since the value of the lock was read using the load instruction. Such load and store instructions will be referred to herein as exclusive load and store instructions, which when executed in combination ensure that an atomic operation takes place, thus ensuring that if a processor determines from the read value of the lock that it is clear, that processor will only be able to store a set value to the lock if it is apparent that no other processor has in the meantime modified the value of the lock.

The shared resource may take a variety of forms. However, in one embodiment the shared resource is a data structure, which may for example comprise a single data value, or multiple data values.

In one embodiment the data structure is provided within a slave device. In one particular embodiment, the data structure is provided within a shared memory region of a memory.

It will be appreciated that the techniques of the present invention may be employed in a data processing apparatus that only has a single shared resource. However, in one embodiment, the data processing apparatus comprises a plurality of shared resources, the access control mechanism being operable to control access to each of the shared resources. The access control mechanism may be a global access control mechanism provided for all of the shared resources, or alternatively a separate access control mechanism may be provided for each shared resource. In one embodiment the access control mechanism comprises a lock for each shared resource.

It will be appreciated that in certain embodiments other actions (other than receipt of the notification) could also be used to cause the processor to exit the power saving mode. For example, in one embodiment, each processor, when in said power saving mode, is operable to exit said power saving mode if an exception is received by that processor. Such an exception may for example be an enabled (i.e. non-masked) interrupt, an imprecise data abort, etc. By allowing the processor to exit the power saving mode in this way, this enables the processor to handle interrupts or other exceptions without impacting the latency.

Viewed from a second aspect, the present invention provides a method of controlling access to a shared resource in a data processing apparatus having a plurality of processors operable to perform respective data processing operations requiring access to the shared resource, a path being provided interconnecting the plurality of processors, the method comprising the steps of: (i) providing an access control mechanism to control access to the shared resource by the plurality of processors; (ii) if access to said shared resource is required by one of said processors but the access control mechanism is preventing access to the shared resource by that processor, causing that processor to enter a power saving mode; (iii) when one of said processors has access to the shared resource, causing that processor to issue a notification on said path when access to the shared resource is no longer required by that processor; (iv) causing a processor in said power saving mode, upon receipt of said notification, to exit said power saving mode and to seek access to the shared resource.

BRIEF DESCRIPTION OF THE DRAWINGS

The present invention will be described further, by way of example only, with reference to preferred embodiments thereof as illustrated in the accompanying drawings, in which:

FIG. 2B is an example of instruction sequences that can be executed in order to implement the locking and unlocking routines embodied by the process of FIG. 2A;

FIG. 4B is an example of instruction sequences that may be executed in order to implement the locking and unlocking routines embodied by the process of FIG. 4A.

DESCRIPTION OF EMBODIMENTS

Figure 1:
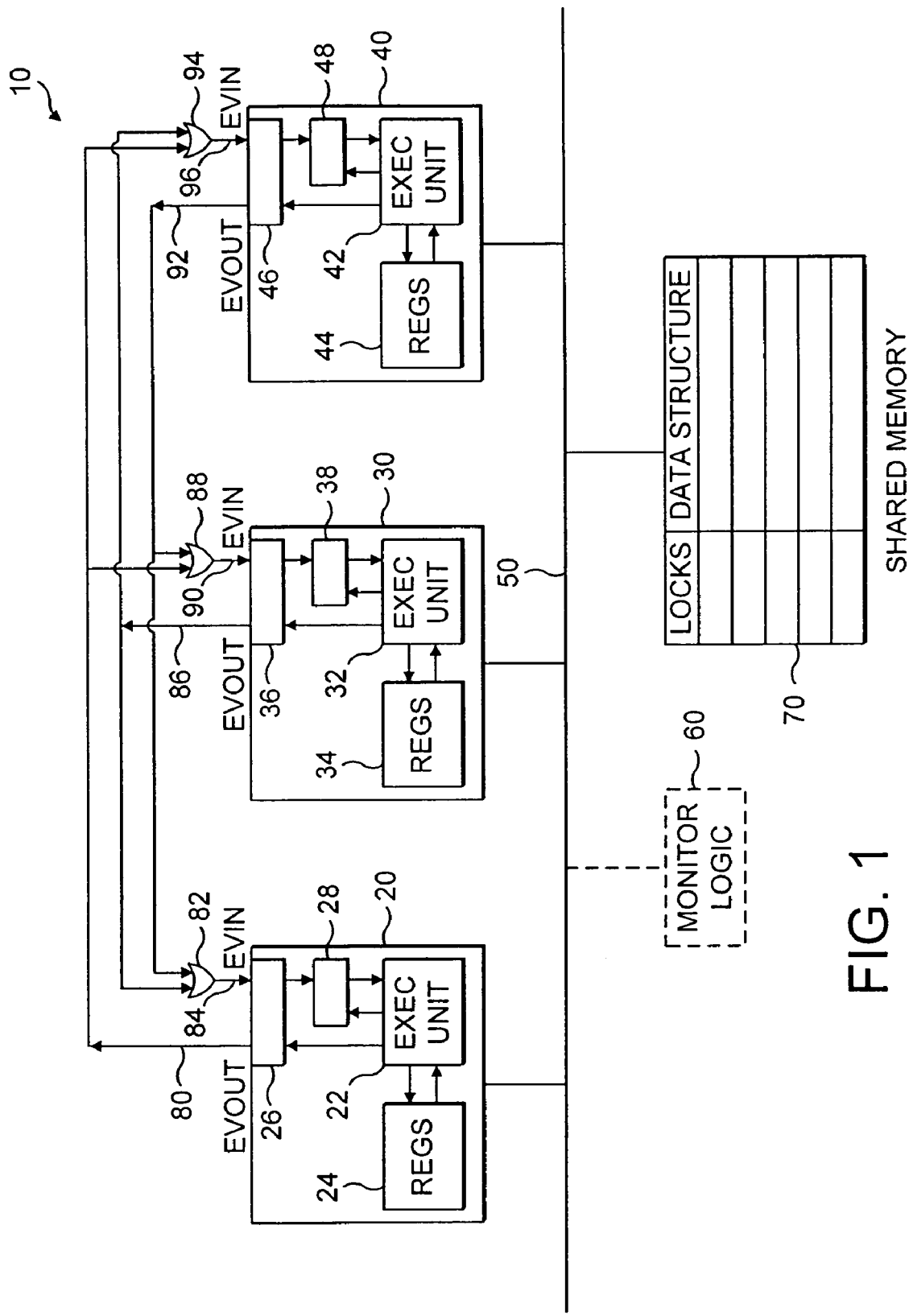
FIG. 1 is a block diagram of a data processing apparatus in accordance with an embodiment of the present invention.

FIG. 1 is a block diagram of a data processing apparatus 10 comprising multiple processors 20, 30, 40 which are coupled via a bus 50 with a shared memory region 70. Within the shared memory region 70 are a number of shared data structures, each of which has a lock associated therewith.

When one of the processors 20, 30, 40 wishes to access one of the data structures within the shared memory 70, it needs to obtain the associated lock. In order to obtain the lock, the processor needs to read the current value of the lock in order to assess whether it can proceed with accessing the data structure. If it can, it will then update the lock and proceed with the access. The operation of reading the lock to assess its current contents, followed by any appropriate update to the lock, needs to occur as an atomic operation, since it is important that no other processor has the opportunity to modify the value of the lock between the time it is read and the time it is modified dependent upon that read value.

In a typical system, only one processor at a time may be allowed to have access to the data structure. When a processor wishes to have access to the shared data structure, then it can only consider the lock to be cleared if the lock indicates that no other processor has access. If this is the case, then that processor can set the lock. Whilst the lock is set in such a manner, no other processor can obtain access to the associated data structure. When the processor having access no longer requires access to the data structure, it will then clear the lock.

Each processor 20, 30, 40 incorporates an execution unit 22, 32, 42, coupled to a set of working registers 24, 34, 44. Each execution unit can execute data processing operations on data values held within the working registers.

As will be discussed in more detail later, when a processor has obtained the lock for a particular data structure, and accordingly has the required access rights to that data structure, it will be arranged when it no longer requires access to that shared data structure to execute a Send Event instruction in order to issue an event on to a dedicated path established between the processors 20, 30, 40. Each of the processors 20, 30, 40 has a port 26, 36, 46 via which the processor is connected to this dedicated path, each port having an event output pin EVOUT and an event input pin EVIN. The event is issued from a processor via its EVOUT pin, and this signal is then routed to the EVIN pin of the other processors. As can be seen from FIG. 1, each EVIN pin has an OR gate 82, 88, 94 associated therewith for combining the various events that may be issued from the other processors.

In addition, each of the processors 20, 30, 40 is arranged such that if it seeks access to a data structure, but the current value of the associated lock indicates that it cannot have access at that time, that processor is then arranged to enter a power saving mode of operation and to remain in that power saving mode of operation until it receives an event at its EVIN pin.

As can be seen from FIG. 1, each processor 20, 30, 40 has an event register 28, 38, 48 provided therein which is set upon receipt of an event at the associated EVIN pin of the processor. The way in which this event register is used will be described in more detail later.

Further, as will be discussed in more detail with reference to the embodiment of FIGS. 4A and 4B, it may be necessary for the data processing apparatus 10 to incorporate monitor logic 60 to monitor accesses to particular locks in order to ensure that the checking of a lock value, and any subsequent setting of that lock, occur as an atomic operation.

Figure 2A:
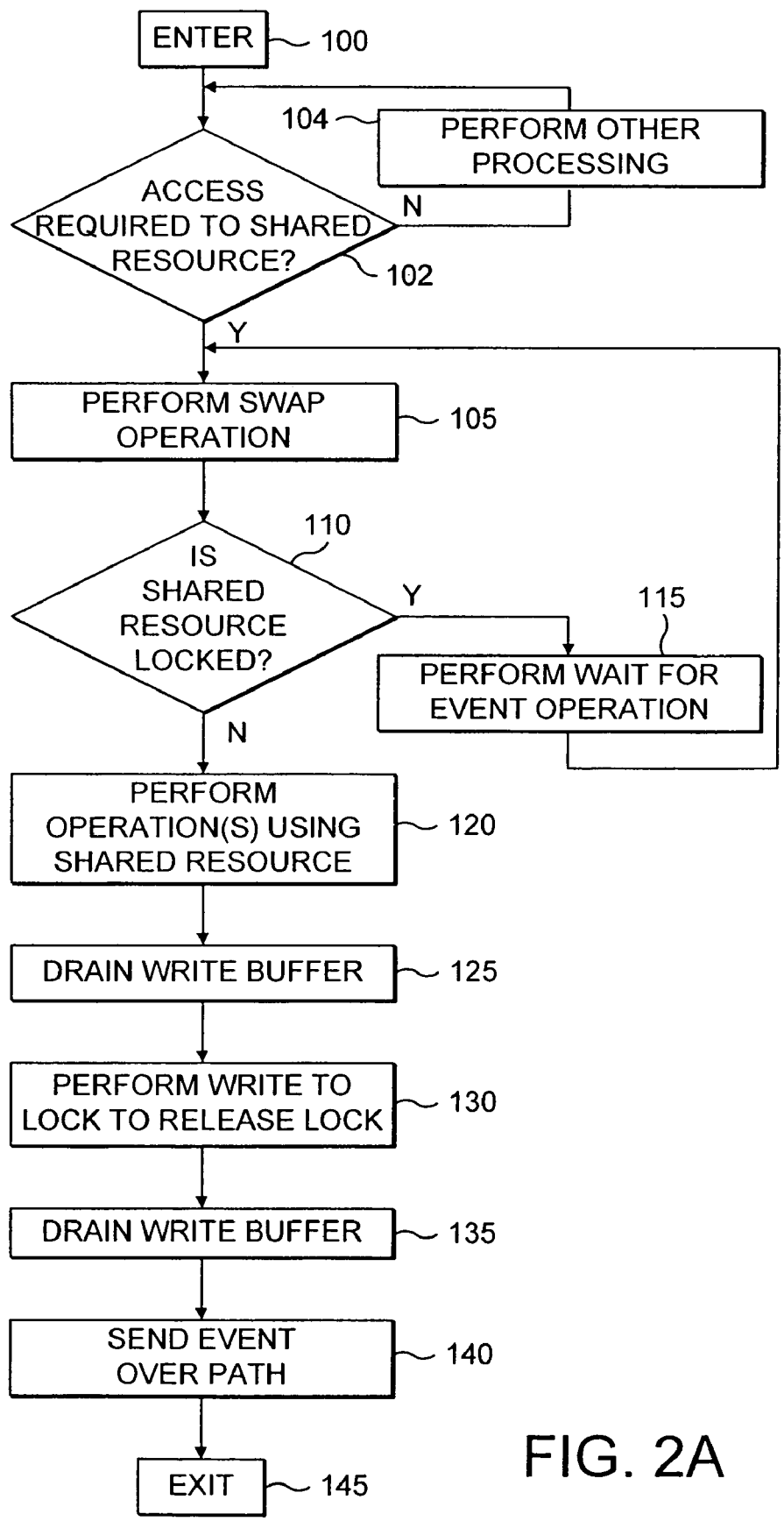
FIG. 2A is a flow diagram illustrating operations performed by each processor of the data processing apparatus of FIG. 1 in accordance with one embodiment of the present invention.

FIG. 2A is a flow diagram of a process that may be performed on each of the processors 20, 30, 40 in order to access a shared data structure, use that shared data structure, and then release the lock associated with that data structure when that shared data structure is no longer required by that processor. At step 100 the process is entered, after which at step 102 the process determines whether access is required to a shared resource, for example one of the shared data structures of the shared memory 70 of FIG. 1. If not the process proceeds to step 104 where the processor performs any other required processing functions, before returning to step 102. Once it is determined at step 102 that access is required to a shared resource, the process proceeds to step 105, where a swap operation is performed. As will be discussed in more detail later with reference to FIG. 2B, this involves the processor executing a swap instruction to read the current value of the relevant lock into one of its working registers and at the same time to write to the lock a value held in one of the working registers (which may for example be the same working register as the one into which the value of the lock is read). The value stored from the designated working register to the lock during this process will be a value indicating that the lock is set.

Thereafter, the process proceeds to step 110, where it is determined whether the shared resource is currently locked, this being indicated by the value of the lock read into the working register of the processor during the swap operation. If it is determined at step 110 that the resource is currently locked, then the process proceeds to step 115 where a wait operation is performed. This process will be discussed in more detail later with reference to FIG. 3, but basically involves the processor entering a power saving mode of operation until such time as that processor receives an incoming event at its EVIN port. The fact that as part of the swap operation the processor has written a set lock value into the lock will be of no effect, since this will merely match the value of the lock that has been read.

If at step 110 it is determined from the value read from the lock that the shared resource is not locked, then the swap operation will have already resulted in the lock being set to indicate that the shared resource is now locked. Hence, the process can now proceed to step 120, where the processor performs one or more operations using the data of the shared resource.

Each of the processors 20, 30, 40 may typically have a write buffer associated therewith into which write accesses to data within the shared memory 70 are placed. When the processor has finished performing any operations that require access to the shared resource, it will need to perform a write to the associated lock in order to clear the lock in order to release the associated data structure for use by another processor. However, some systems provide mechanisms whereby write accesses pending in a write buffer may complete out of order, and it is important to ensure that any write accesses to the data structure occur prior to the writing to the associated lock in order to release that lock.

Accordingly, prior to writing to the lock, the process will proceed from step 120 to step 125, where the processor will cause its write buffer to be drained. Then, at step 130, it will issue a write operation to the relevant lock in order to clear that lock, also referred to herein as releasing the lock. At this point, the processor is then ready to issue the event (also referred to herein as the notification) from its EVOUT pin onto the path interconnecting the various processors, but it must be ensured that the update to the lock has actually taken place before this occurs. Accordingly, prior to issuing the event, the processor proceeds to step 135, where again the processor causes its write buffer to be drained. Thereafter, at step 140 the event is sent over the path to the other processors, after which the process exits at step 145.

FIG. 2B illustrates a sequence of instructions which may be executed by a processor in order to implement the lock and unlock routines discussed with reference to FIG. 2A. The lock routine can be considered to be embodied by the steps 105, 110 and 115, whereas the unlock routine can be considered to be embodied by the steps 125, 130, 135 and 140. Considering first the lock routine, a move instruction can be used to store within register r0 the value 1. Thereafter a swap instruction is executed to move the current contents of the register r0 to the lock identified by the lock address, and at the same time to store the current value of the lock at that lock address into the register r0. Then a compare instruction is arranged to determine whether the value of the lock as read from the lock address is zero, if it is zero this indicating that the lock is currently clear and hence the associated shared resource is available for access by the processor. Accordingly, if the compare operation does determine that r0 contains a zero value, then the process can proceed directly to step 120 in order to perform the necessary operations using the shared resource. It should be noted that as part of the swap operation the relevant lock was set, and accordingly no further action is required to set the lock at this stage.

If however it was determined as a result of executing the compare operation that the current content of register r0 is a logic one value, then this will indicate that the lock had already been set by a different processor, and accordingly the processor cannot proceed with its required access to the shared resource. Instead, a wait for event instruction, also referred to herein as a wait for notification instruction, is executed. The operations performed as a result of executing this instruction will be discussed later with reference to FIG. 3. Once the wait for event instruction has completed execution, then a branch instruction is executed to loop the processing back to the swap instruction.

Once a processor has access to the shared resource, and has performed the necessary operations that it requires using the shared resource, it needs to implement the unlock routine. As shown in FIG. 2B, this can be implemented by executing a move instruction to store a logic zero value into the register 0, after which a further instruction is executed to drain the write buffer. It will be appreciated that there are a number of possible instructions which could be used to drain the write buffer. Once the write buffer has been drained, a store instruction is performed in order to store into the lock (as identified by the lock address) the contents of the register r0, this resulting in the relevant lock being cleared. Thereafter, a further instruction is executed to again drain the write buffer and thereafter a send event instruction (also referred to herein as a send notification instruction) is executed in order to issue the event from the EVOUT port of the processor.

Figure 3:
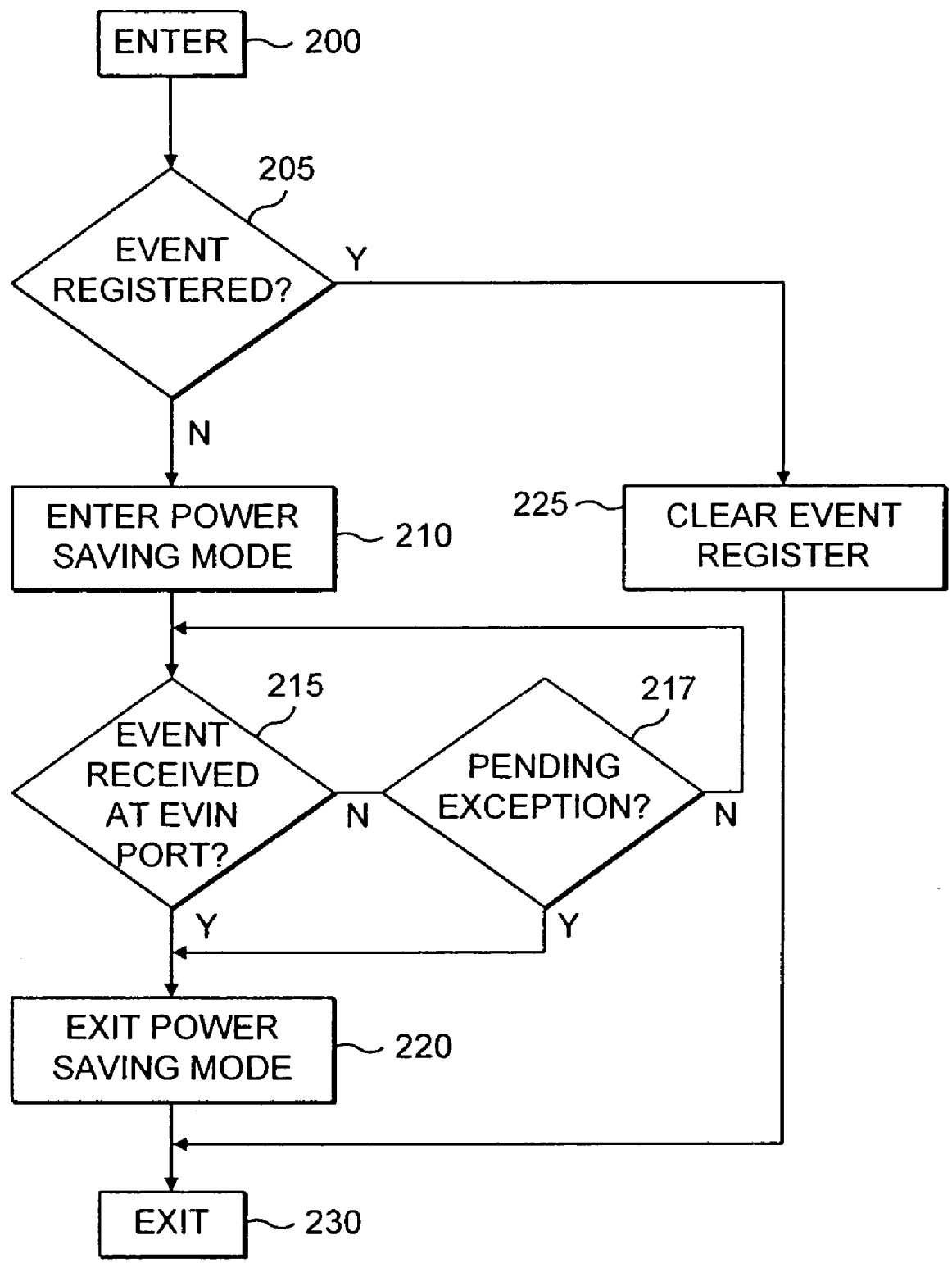
FIG. 3 is a flow diagram of the steps performed in order to implement the wait for event operation of FIG. 2A.

FIG. 3 is a flow diagram illustrating in more detail the steps performed when executing the wait for event operation at step 115 of FIG. 2A. At step 200 the process is entered, and at step 205 it is determined whether an event has been registered in the event register 28, 38, 48 of the processor 20, 30, 40. This may, for example, be the case if, whilst the processor was performing steps 105 and 110 of FIG. 2A, another processor that had locked the shared resource had finished with that resource and hence issued an event from its EVOUT port. If it is determined at step 205 that an event has been registered in the event register, then that event register is cleared at step 225, and the process exits at step 230. With reference to FIG. 2A, it can be seen that in this instance the process returns directly to step 105 to perform the swap operation again. This may or may not result in the processor successfully being able to obtain the lock and have access to the required shared resource, but if it does not it can be seen from FIG. 2A that the process will loop back to the wait for event operation again.

It at step 205 it is determined that an event is not registered in the event register, then the process proceeds to step 210, where the processor enters a power saving mode. In one embodiment, this power saving mode places the processor in as low a power state as possible consistent with a fast wake up without the need for software state restoration. Thereafter, the process proceeds to step 215, where it is determined whether an event has been received at the EVIN port of the processor. If not, the process proceeds to step 217 where it is determined whether there is a pending exception. Such an exception may for example be an enabled (i.e. non-masked) interrupt, an imprecise data abort, etc. The provision of such a step is beneficial since it enables the processor to be able to handle interrupts or other exceptions without impacting the latency. In the event that no such exception is detected at step 217, the process returns to step 215.

Once either receipt at the EVIN port of an event is detected at step 215, or a pending exception is detected at step 217, the process proceeds to step 220, to cause the power saving mode to be exited. Thereafter, the wait for event operation exits at step 230. With reference to FIG. 2A, it can then be seen that, if the power saving mode was exited due to receipt of an event at step 215, the process then returns to step 105 to perform the swap operation in order to seek access to the shared resource. If the power saving mode were instead exited due to a pending exception being detected at step 217, the processor can then perform the necessary functions to handle that exception, for example by running an exception routine. Once this exception routine has been completed, the processor may in due course return to execution of the original routine requiring the lock for the shared resource. When this happens, the processor will re-perform steps 105 and 110 in order to seek to acquire the lock, and only if the resource is still locked at that time will the processor then re-perform the wait for event routine at step 115.

At step 215, the processor is arranged to directly receive the signal received at the EVIN port, rather than it first being latched within the event register 28, 38, 48. However, if instead all signals received at the EVIN port are first latched in the event register, then on exiting the power saving mode at 220 due to detection of an event at step 215, the processor would also be arranged to clear the event register prior to exiting at step 230.

It will be appreciated that such an approach results in significant power savings when compared with a traditional prior art approach, during which the processor would repeatedly read the lock value in a tight loop until the lock became available. Instead, the processor enters a power saving mode and waits to be woken up by receipt of an event from a processor indicating that a lock has been released.

It will be appreciated that in certain embodiments other actions could also be used to cause the processor to exit the power saving mode. For example, the processor may be arranged to exit the power saving mode if a debug entry request is received by the processor.

Figure 4A:
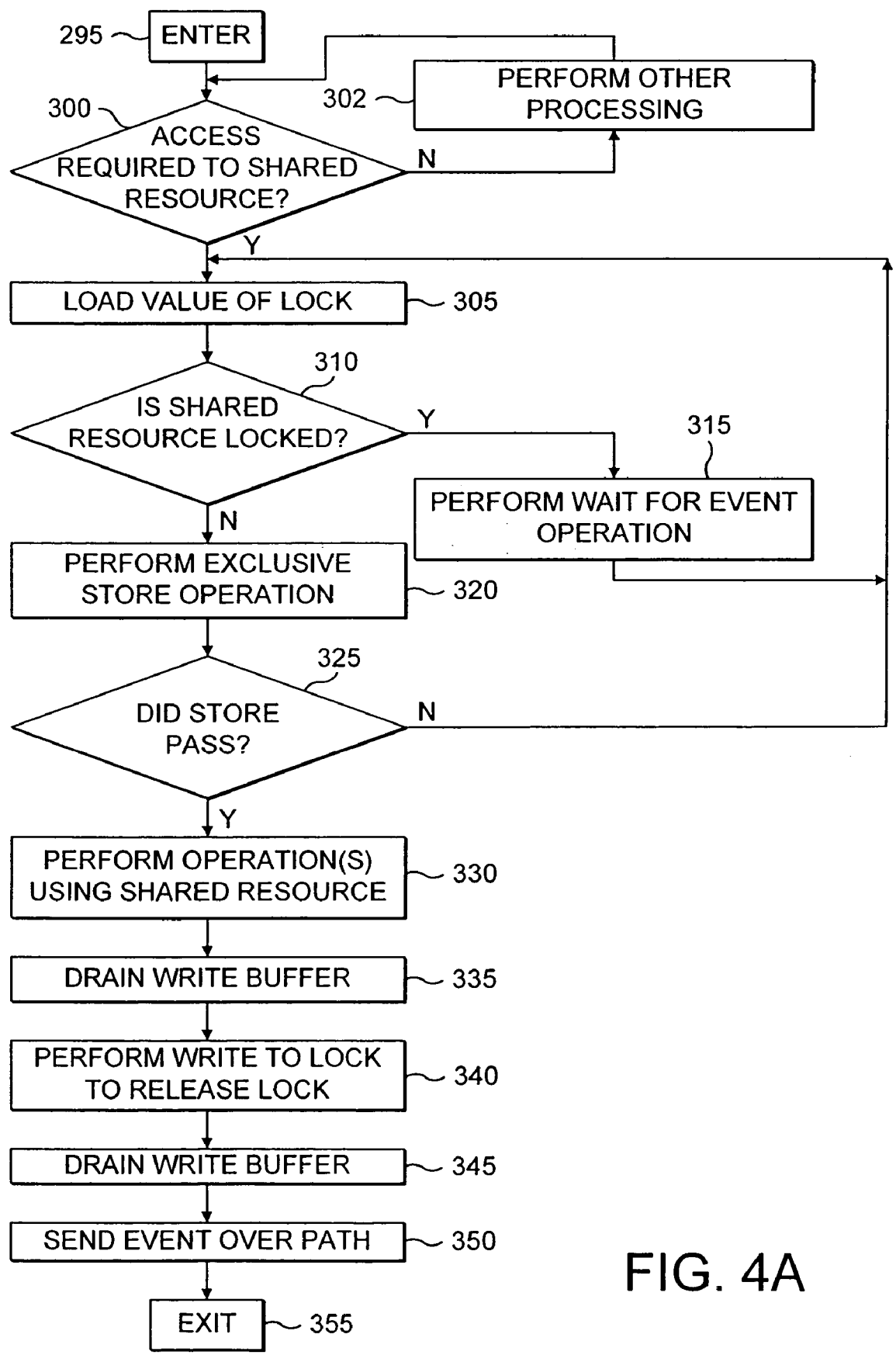
FIG. 4A is a flow diagram illustrating operations performed by each processor of the data processing apparatus of FIG. 1 in accordance with an alternative embodiment of the present invention.

FIG. 4A illustrates an alternative sequence of operations to that discussed earlier with reference to FIG. 2A, which may be used in an alternative embodiment of the present invention. At step 295, the process is entered, whereafter at step 300 it is determined whether access to a shared resource is required. If not the process proceeds to step 302 where the processor performs any other required processing functions, before returning to step 300. When it is determined at step 300 that access to such a shared resource is required, the process proceeds to step 305, where the value of the associated lock is loaded into one of the working registers of the processor. As will be discussed in more detail with reference to FIG. 4B, the load instruction used to perform this load will typically also cause monitor logic 60 to begin monitoring the lock address in order to keep track of any other accesses to that lock address.

At step 310, it is determined whether the shared resource is locked by reviewing the value loaded from the lock address. If the resource is locked, then the process proceeds to step 315 where a wait for event operation is performed. Step 315 of FIG. 4A is analogous to step 115 of FIG. 2A, and accordingly this operation will perform the process discussed earlier with reference to FIG. 3.

If however it is determined that the shared resource is not locked at step 310, then the process proceeds to step 320 where an exclusive store operation is performed. As will be discussed later with reference to FIG. 4B, this causes a set lock value to be stored at the lock address provided that the monitor logic indicates that no intervening modifications to the lock have been made. If the monitor logic indicates that such intervening modifications have been made, the store operation will not proceed with the writing of the set value to the lock address.

At step 325, it is determined whether the store operation passed its conditions for execution, i.e. there were no intervening modifications to the lock. If the store did not pass its conditions, and hence the write did not take place, the process returns to step 305.

Assuming that the store operation did pass its conditions, and accordingly was executed, the process proceeds from step 325 to step 330, where any required operations using the shared resource are performed. Steps 330, 335, 340, 345, 350 and 355 are analogous to steps 120, 125, 130, 135, 140 and 145 discussed earlier with reference to FIG. 2A, and result in the lock being released following the performance of the required operations using the shared resource, and for an event to then be issued by the processor for receipt by the other processors.

FIG. 4B is an example of a sequence of instructions which can be executed in order to implement the lock routine and unlock routine of FIG. 4A. The unlock routine, which consists of steps 335, 340, 345, 350 is identical to that discussed earlier with reference to FIG. 2B, and hence will not be discussed further herein. However, the lock routine, which is embodied by steps 305, 310, 315, 320, is different to the lock routine discussed earlier with reference to FIG. 2B. Firstly, a move instruction is executed in order to store a logic one value in register r1, whereafter an exclusive load instruction is executed to store into the register r0 the value of the lock as specified by the lock address. This load operation also causes the monitor logic 60 to begin monitoring the lock address.

Thereafter a compare instruction is executed to determine whether the content of register r0 (i.e. the lock value as read from the lock address) is a logic zero value. If the content of register r0 is equal to zero, this indicates that the lock was cleared at the time it was read, and accordingly a store exclusive operation is then executed to store to the lock address the contents of register r1, i.e. to store a logic one value at the lock address. However, execution of this store exclusive instruction is conditional upon the monitor logic 60 indicating that no intervening modifications to the lock value have been made since the lock value was read by the load exclusive instruction. The store exclusive instruction also causes register r0 to be updated with a value indicating whether the store took place or not. In particular, r0 is set to a logic zero value if no intervening modifications to the lock were made, and accordingly the store took place, or is set to a logic one value if intervening modifications to the lock did take place, and accordingly the store did not proceed.

If the result of the previous compare instruction was that the contents of register r0 were not equal to zero (i.e. indicating that the lock had already been set by a different processor), then instead of executing the store exclusive instruction the processor will execute a wait for event instruction, this causing the processing steps discussed earlier with reference to FIG. 3 to be performed. When the wait for event instruction has completed execution, and accordingly the processor has either cleared the event register, or has entered a power saving mode, received an event, and then exited the power saving mode, the processor will execute a branch instruction to loop back to execution of the load exclusive instruction. The compare instruction located between the wait for event instruction and the branch instruction is in this instance not executed because execution of that compare instruction is conditional upon the previous compare instruction having determined that the contents of r0 were equal to zero.

However, this second compare instruction is executed following execution of the store exclusive instruction, since the store exclusive instruction is only executed if the first comparison instruction concluded that the contents of register r0 were equal to zero. As discussed earlier, execution of the store exclusive instruction also results in register r0 being updated with a value indicating whether the store actually took place or not. This second compare instruction then determines whether the content of r0 is equal to zero, this indicating that the store did take place, and that accordingly the processor has locked the shared resource and can proceed to have access to the resource. However, if as a result of execution of this second compare instruction it is determined that the contents of r0 are not equal to zero, this will indicate that the store did not take place, and accordingly the processor then executes the branch instruction to return to the load exclusive instruction.

As will be appreciated from the above description, the technique of embodiments of the present invention provides a mechanism to allow a processor waiting a spin-lock to enter a low power state. The processor that currently holds the desired spin-lock sends an event when releasing the lock, which causes the waiting processor to wake up and attempt to gain the lock again. A complex operating system may contain thousands of distinct locks, and in the above described embodiments no attempt is made to indicate which lock has been released when the event is sent. If the event relates to a different lock (or if another processor obtains the lock more quickly), the processor that has woken up will fail to acquire the lock, and will re-enter the low power state waiting for the next event.

The technique of the above described embodiments of the present invention relies on hardware and software to achieve the energy saving. The hardware is adapted to provide a path to enable an event issued by one processor to be routed to all of the other processors having access to the shared resource, and each processor is further provided with a register which can be set to indicate whether an event has been received by that processor. Two new instructions, namely a send event instruction and a wait for event instruction are added. The hardware hence provides the mechanism to enter the wait for event low power state, and the operating system software is responsible for issuing wait for event instructions and send event instructions when waiting for a contended lock and releasing a lock respectively.

It will be appreciated by those skilled in the art that the same wait for event and send event instructions could be used with more complex locks than those described in the above embodiments, for example read/write locks, to achieve a similar energy saving.

It will further be appreciated by those skilled in the art that the techniques of the present invention may be utilised in embodiments using atomic operations other than the two types of atomic operation explicitly described in the above embodiment description.

In one embodiment of the present invention, the process of acquiring locks may be nested, and hence when the processor acquires a lock at step 110 of FIG. 2A or step 310 of FIG. 4A, the subsequent operations performed at step 120 of FIG. 2A or step 330 of FIG. 4A may involve the processor seeking to acquire another lock and entering the power saving mode if that lock is not available at that time.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
a plurality of processors operable to perform respective data processing operations requiring access to a shared resource;
an access control mechanism operable to control access to the shared resource by the plurality of processors;
a path interconnecting the plurality of processors;
each processor being operable to enter a power saving mode if access to said shared resource is required but the access control mechanism is preventing access to the shared resource by that processor;
each processor further being operable, when that processor has access to the shared resource, to issue a notification on said path when access to the shared resource is no longer required by that processor;
a processor in said power saving mode being operable, upon receipt of said notification, to exit said power saving mode and to seek access to the shared resource.

2. A data processing apparatus as claimed in claim 1, wherein the path comprises a dedicated path for the transfer of said notification between said plurality of processors, each of said processors having a port connected to said path.

3. A data processing apparatus as claimed in claim 1, wherein each processor is operable, when access to the shared resource is no longer required, to broadcast the notification to the remaining processors of said plurality.

4. A data processing apparatus as claimed in claim 1, wherein each processor has control storage which is set when said notification is received by that processor from the path.

5. A data processing apparatus as claimed in claim 4, wherein each processor is operable, if access to said shared resource is required but the access control mechanism is preventing access to the shared resource by that processor, to execute a wait for notification instruction to cause said power saving mode to be entered, and wherein upon execution of the wait for notification instruction, the processor is operable to check whether the control storage has been set and if so to prevent the power saving mode being entered.

6. A data processing apparatus as claimed in claim 1, wherein each processor is operable, if access to said shared resource is required but the access control mechanism is preventing access to the shared resource by that processor, to execute a wait for notification instruction to cause said power saving mode to be entered.

7. A data processing apparatus as claimed in claim 1, wherein each processor is operable, when access to the shared resource is no longer required by that processor, to execute a send notification instruction to cause said notification to be issued on said path.

8. A data processing apparatus as claimed in claim 1, wherein the access control mechanism comprises a lock associated with the shared resource, when that shared resource is accessed by one of said processors the lock being set, and when access to the shared resource is no longer required by that processor the lock being cleared prior to that processor issuing said notification on said path.

9. A data processing apparatus as claimed in claim 8, wherein when one of said processors wishes to access said shared resource, that processor is operable to perform an atomic operation to check whether the associated lock is cleared and if so to set the associated lock.

10. A data processing apparatus as claimed in claim 9, wherein the processor is operable to perform said atomic operation by executing a swap instruction to cause the processor to read the value of the lock, to write a set value to the lock and to determine from the read value whether the associated lock was cleared.

11. A data processing apparatus as claimed in claim 9, further comprising:
monitor logic operable to monitor accesses to the lock by the plurality of processors;
wherein the processor is operable to perform said atomic operation by:
executing a load instruction to read the value of the lock and to initiate monitoring of the lock by the monitor logic; and
executing a store instruction to store a set value to the lock if the monitor logic indicates that none of the other processors have modified the value of the lock since the value of the lock was read using the load instruction.

12. A data processing apparatus as claimed in claim 1, wherein the shared resource is a data structure.

13. A data processing apparatus as claimed in claim 12, wherein the data structure is provided within a slave device.

14. A data processing apparatus as claimed in claim 12, wherein the data structure is provided within a memory.

15. A data processing apparatus as claimed in claim 1, comprising a plurality of shared resources, the access control mechanism being operable to control access to each of the shared resources.

16. A data processing apparatus as claimed in claim 15, wherein the access control mechanism comprises a lock for each shared resource.

17. A data processing apparatus as claimed in claim 1, wherein each processor, when in said power saving mode, is operable to exit said power saving mode if an exception is received by that processor.

18. A method of controlling access to a shared resource in a data processing apparatus having a plurality of processors operable to perform respective data processing operations requiring access to the shared resource, a path being provided interconnecting the plurality of processors, the method comprising the steps of:
(i) providing an access control mechanism to control access to the shared resource by the plurality of processors;
(ii) if access to said shared resource is required by one of said processors but the access control mechanism is preventing access to the shared resource by that processor, causing that processor to enter a power saving mode;
(iii) when one of said processors has access to the shared resource, causing that processor to issue a notification on said path when access to the shared resource is no longer required by that processor;
(iv) causing a processor in said power saving mode, upon receipt of said notification, to exit said power saving mode and to seek access to the shared resource.

19. A method as claimed in claim 18, wherein the path comprises a dedicated path for the transfer of said notification between said plurality of processors, each of said processors having a port connected to said path.

20. A method as claimed in claim 18, wherein at said step (iii) the notification is broadcast to the remaining processors of said plurality.

21. A method as claimed in claim 18, wherein each processor has control storage, and the method further comprises the step of setting that control storage when said notification is received by that processor from the path.

22. A method as claimed in claim 21, wherein said step (ii) comprises the step of executing a wait for notification instruction to cause said power saving mode to be entered, and wherein upon execution of the wait for notification instruction, the processor checks whether the control storage has been set and if so prevents the power saving mode being entered.

23. A method as claimed in claim 18, wherein said step (ii) comprises the step of executing a wait for notification instruction to cause said power saving mode to be entered.

24. A method as claimed in claim 18, wherein said step (iii) comprises the step of executing a send notification instruction to cause said notification to be issued on said path.

25. A method as claimed in claim 18, wherein the access control mechanism comprises a lock associated with the shared resource, when that shared resource is accessed by one of said processors the lock being set, and when access to the shared resource is no longer required by that processor the lock being cleared prior to that processor issuing at said step (iii) said notification on said path.

26. A method as claimed in claim 25, wherein when one of said processors wishes to access said shared resource, that processor performs an atomic operation to check whether the associated lock is cleared and if so to set the associated lock.

27. A method as claimed in claim 26, wherein the processor performs said atomic operation by executing a swap instruction to read the value of the lock, to write a set value to the lock and to determine from the read value whether the associated lock was cleared.

28. A method as claimed in claim 26, wherein the processor is operable to perform said atomic operation by:
executing a load instruction to read the value of the lock;
initiating monitor logic to monitor accesses to the lock by the plurality of processors; and executing a store instruction to store a set value to the lock if the monitor logic indicates that none of the other processors have modified the value of the lock since the value of the lock was read using the load instruction.

29. A method as claimed in claim 18, wherein the shared resource is a data structure.

30. A method as claimed in claim 29, wherein the data structure is provided within a slave device.

31. A method as claimed in claim 29, wherein the data structure is provided within a memory.

32. A method as claimed in claim 18, wherein the data processing apparatus comprises a plurality of shared resources, the access control mechanism being operable to control access to each of the shared resources.

33. A method as claimed in claim 32, wherein the access control mechanism comprises a lock for each shared resource.

34. A method as claimed in claim 18, wherein each processor, when in said power saving mode, exits said power saving mode if an exception is received by that processor.

* * * * *